United States Patent
Alizadeh et al.

(10) Patent No.: US 10,904,831 B2
(45) Date of Patent: Jan. 26, 2021

(54) SPATIAL MODULATION-BASED GROUPINGS FOR DEVICE POWER SAVINGS

(71) Applicant: Cisco Technology, Inc., San Jose, CA (US)

(72) Inventors: Ardalan Alizadeh, San Jose, CA (US); Amir Hosein Kamalizad, San Mateo, CA (US); Khashayar Mirfakhraei, Los Altos, CA (US); Xu Zhang, Freemont, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 16/406,184

(22) Filed: May 8, 2019

(65) Prior Publication Data
US 2020/0359317 A1 Nov. 12, 2020

(51) Int. Cl.
*H04L 5/00* (2006.01)
*H04W 52/02* (2009.01)
*H04L 25/02* (2006.01)

(52) U.S. Cl.
CPC ..... *H04W 52/0219* (2013.01); *H04L 25/0204* (2013.01); *H04W 52/0216* (2013.01); *H04W 52/0222* (2013.01); *H04L 5/0023* (2013.01)

(58) Field of Classification Search
None
See application file for complete search history.

(56) References Cited

U.S. PATENT DOCUMENTS

| | | |
|---|---|---|
| 2011/0194475 A1 | 8/2011 | Kim et al. |
| 2012/0182980 A1 | 7/2012 | Abraham et al. |
| 2015/0071142 A1* | 3/2015 | Kim ................. H04W 52/0238 370/311 |
| 2015/0092641 A1 | 4/2015 | Koc et al. |
| 2016/0366644 A1* | 12/2016 | Ghosh ..................... H04W 4/70 |
| 2017/0111875 A1* | 4/2017 | Azizi .................. H04W 56/001 |

FOREIGN PATENT DOCUMENTS

| | | |
|---|---|---|
| EP | 3364579 | 8/2018 |
| WO | 2015020473 | 2/2015 |

OTHER PUBLICATIONS

Kim, et al., "802.11 WLAN: History and New Enabling MIMO Techniques for Next Generation Standards", The Future of WiFi, IEEE Communications Magazine, Mar. 2015, pp. 134-140, IEEE.
Helmy, et al., "Spatial Modulation for Improved Performance of Next-Generation WLAN", 2017 IEEE Wireless Communications and Networking Conference (WCNC), 2017, pp. 1-6, IEEE.
Zhang, Meng., Cheng, Xiang., "Integrating Spatial Modulation Into 802.11n", 5 pages, 2016.

* cited by examiner

*Primary Examiner* — Edan Orgad
*Assistant Examiner* — Emmanuel K Maglo
(74) *Attorney, Agent, or Firm* — Behmke Innovation Group LLC; Kenneth J. Heywood; Jonathon P. Western (57) ABSTRACT

In one embodiment, a device in a network receives, at its wireless receiver, a preamble of a spatially modulated packet. The device analyzes the preamble of the packet to identify a transmit antenna index of the packet. The device determines that the packet was not destined for the device, based on the transmit antenna index of the packet. The device depowers, prior to decoding the complete packet, the wireless receiver of the device, based on the determination that the packet was not destined for the device.

20 Claims, 8 Drawing Sheets

SPATIAL MODULATION-BASED GROUPINGS FOR DEVICE POWER SAVINGS

TECHNICAL FIELD

The present disclosure relates generally to computer networks, and, more particularly, to spatial modulation-based device groupings.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

In contrast to many traditional computer networks, various challenges are presented with IoT devices, such as lossy links, low bandwidth, battery operation, low memory and/or processing capability of the device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to the IoT.

As noted, most IoT devices are battery powered, making low-power operations indispensable, as there exists a tradeoff between latency and battery life. To extend the battery life of an IoT device, many devices will periodically enter into a sleep mode. Thus, if an IoT device requires lower latency and higher responsiveness, it must be awake and available on the wireless network more frequently, which significantly reduces its battery life. One key observation is that an awake IoT device will spend a large amount of resources processing the media access control (MAC) headers of all packets that it receives, even for ones that are not destined/intended for the IoT device. As introduced herein, reducing this packet processing through the use of spatial modulation-based device groupings can help to increase the battery life of an IoT device, considerably.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives, at its wireless receiver, a preamble of a spatially modulated packet. The device analyzes the preamble of the packet to identify a transmit antenna index of the packet. The device determines that the packet was not destined for the device, based on the transmit antenna index of the packet. The device depowers, prior to decoding the complete packet, the wireless receiver of the device, based on the determination that the packet was not destined for the device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
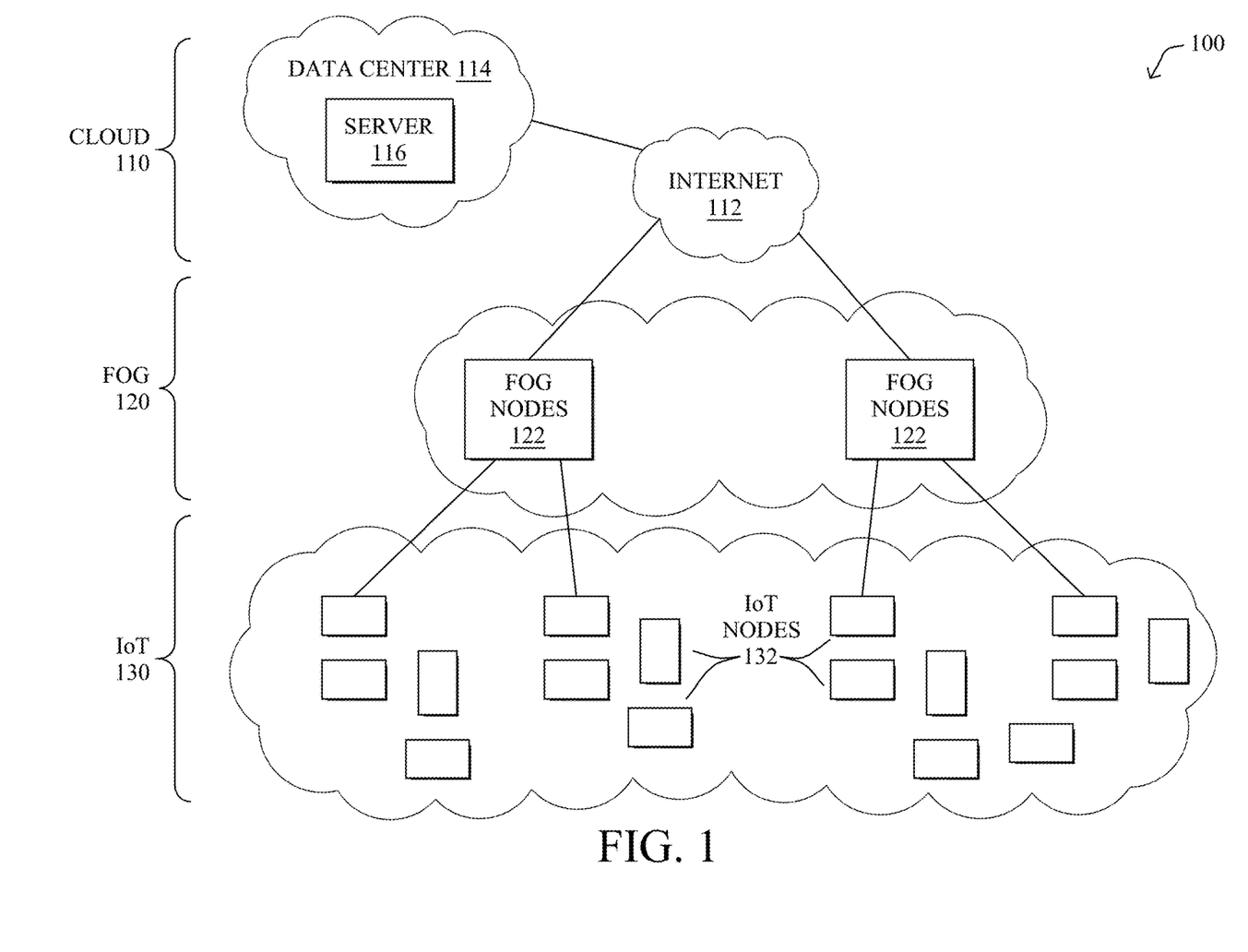
FIG. 1 illustrate an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
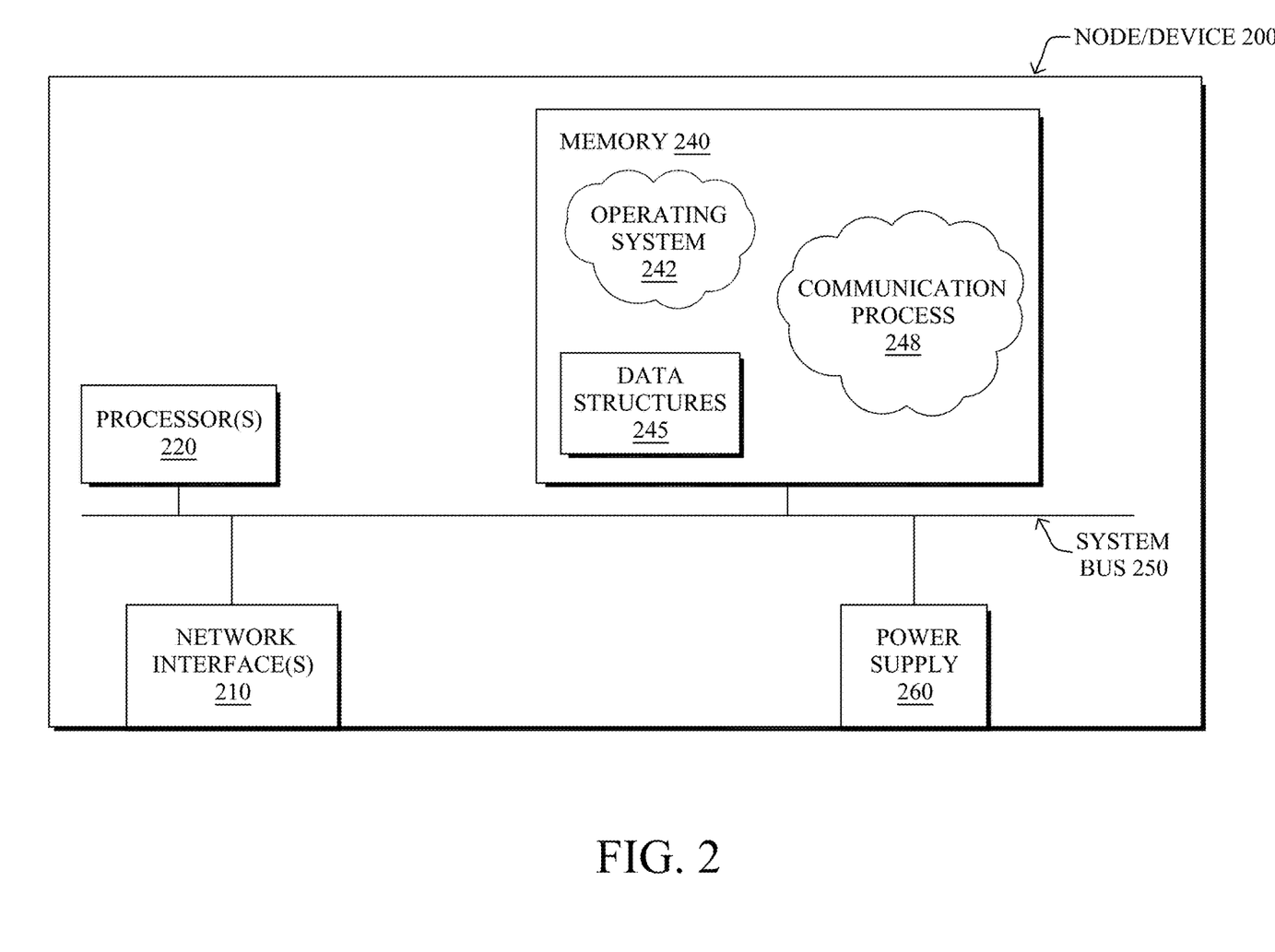
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data to and/or from a network. For example, network interface(s) 210 may include a wireless receiver, transmitter, or both (e.g., a transceiver).

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a communication process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
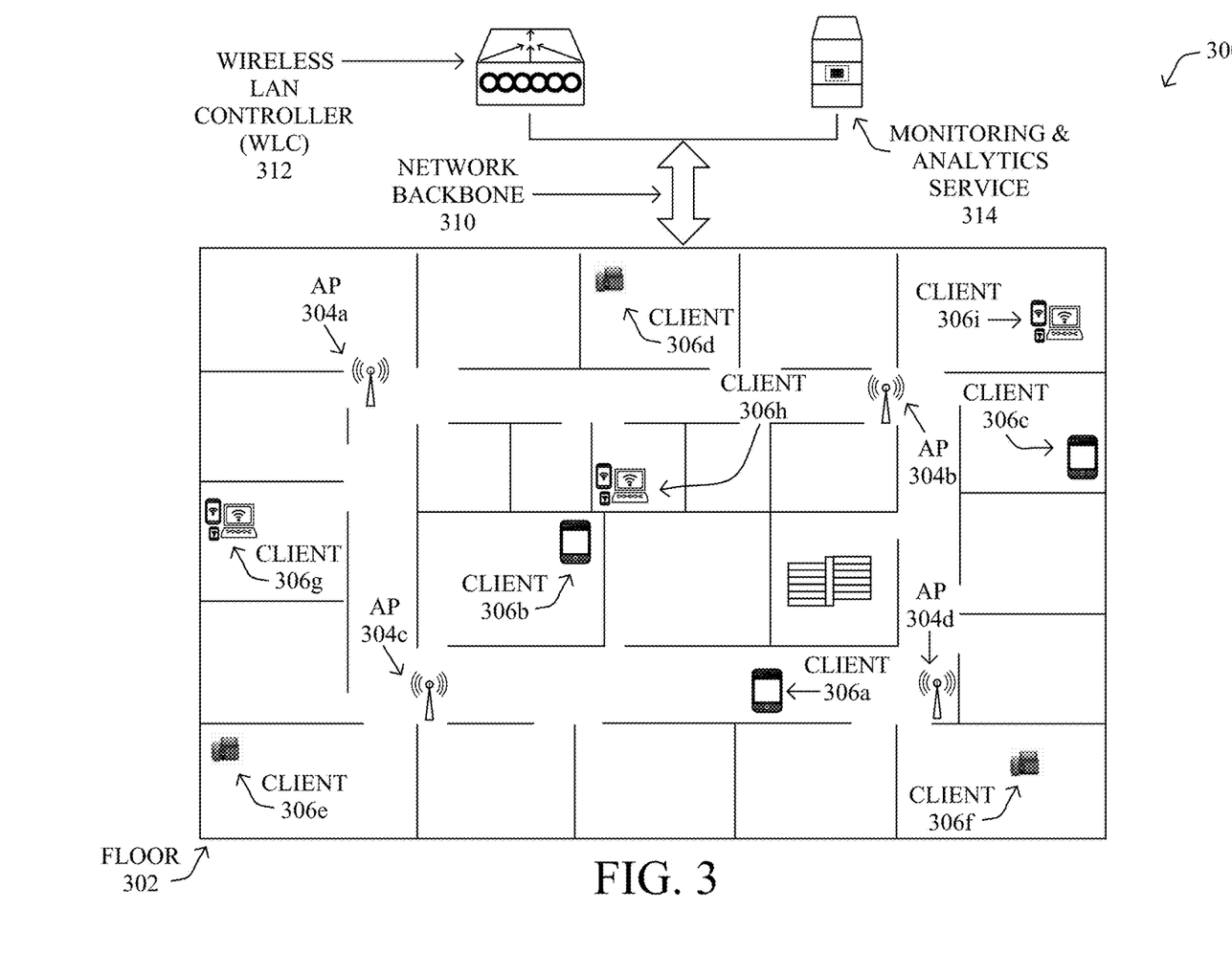
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-404d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.). Note that service 314 may be implemented directly on WLC 312 or may operate in conjunction therewith, in various implementations.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

The types and configurations of clients 304 in network 300 can vary greatly and include any number of different types of IoT nodes/devices. For example, clients 306a-306c may be mobile phones, clients 306d-306f may be office phones, and clients 306g-306i may be computers, all of which may be of different makes, models, and/or configurations (e.g., firmware or software versions, chipsets, etc.). Further examples of clients 306 can include, but are not limited to, wireless sensors, actuators, thermostats, relays, and the like.

As noted above, power operation is an indispensable feature in many IoT devices. To account for the tradeoff between latency and battery life, various approaches have been proposed. For example, one proposal under the 802.11 protocol is to implement a Power Save Mode (PSM) in which the wireless client (STA) can sleep when data is not being communicated. However, with this duty-cycled operation, low power consumption and low latency are conflicting goals. In order to increase battery life, a device needs to sleep more often, which causes increased latency in communications with the device. To receive data with low latency, a device needs to sleep less frequently, which causes shorter battery life. So, the ultimate goal is to provide a solution that consumes less power, while keeping the IoT devices more responsive with low latency.

Even when subjecting an IoT device to sleep cycles to decrease battery consumption, there is still a considerable amount of unnecessary processing by the device that still consumes power. For example, in its awake mode, a typical IoT device will need to decode all media access control (MAC) headers of its received packets, to identify and extract the payloads of the packets that are actually intended/destined for the device.

Spatial Modulation-Based Groupings for Device Power Savings

The techniques herein introduce a power saving approach for wireless devices that relies on spatial modulation to group devices according to the antenna index of the sender. In doing so, a receiving device can quickly filter out packets not intended/destined for the device by only processing the preamble of the packets, as opposed to its full MAC header, reducing power consumption by the device.

Specifically, according to one or more embodiments of the disclosure as described in detail below, a device in a network receives, at its wireless receiver, a preamble of a spatially modulated packet. The device analyzes the preamble of the packet to identify a transmit antenna index of the packet. The device determines that the packet was not destined for the device, based on the transmit antenna index of the packet. The device depowers, prior to decoding the complete packet, the wireless receiver of the device, based on the determination that the packet was not destined for the device.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Operationally, the techniques herein provide for device power savings by leveraging the preamble of a wireless packet in which the Amplitude-Phase Modulation (APM) domain is known to the receiving device and device group numbers are conveyed via the spatial domain of the packet. In various embodiments, the receiving device can identify the multicast address of the packet (e.g., the group number) by detecting the antenna index of transmitter. If the group number does not match that of the device, the device may skip decoding the rest of the packet and turn off its radio to save power.

According to various embodiments, the techniques herein introduce a flexible framework that can work on top of other power saving mechanisms such as a legacy power management policy, Target Wake Time (TWT), and 802.11ba wake-up radio, to conserve even more power by depowering the radio and stopping further decoding of the packet after decoding the legacy signal (L-SIG) field of the packet. For example, in some embodiments, the device may determine a spatial multicast address of the packet by estimating the channel used from the legacy long training field (L-LTF) of the packet. This allows the device to quickly determine whether the packet is intended/destined for the device. In addition, the techniques herein can be implemented without requiring any additional radios on the sender or receiver.

In general, spatial modulation is a multiple-antenna transmission technique that uses antenna indexes as an additional means of data transmissions. In this scheme, a spatial modulation symbol, which consists of multiple bits, is transmitted over two domains:

1.) The Amplitude-Phase Modulation (APM) Domain— this can take the form of any conventional digital modulation such as, but not limited to, binary phase shift keying (BPSK), quadrature phase shift keying (QPSK), cross quadrature amplitude modulation (xQAM), and the like.

2.) The Spatial Domain—this can be utilized by assigning the index of active transmit antenna to each symbol.

As would be appreciated, spatial modulation can offer improved data rates compared to Single-Input Single-Output (SISO) systems, and offers robust performance, in terms of bit and packet error rates, even in correlated channel environments. In a typical embodiment of spatial modulation, only the receiver requires the Channel State Information (CSI) from each transmit antenna and CSI is not required at transmitter.

Figure 4:
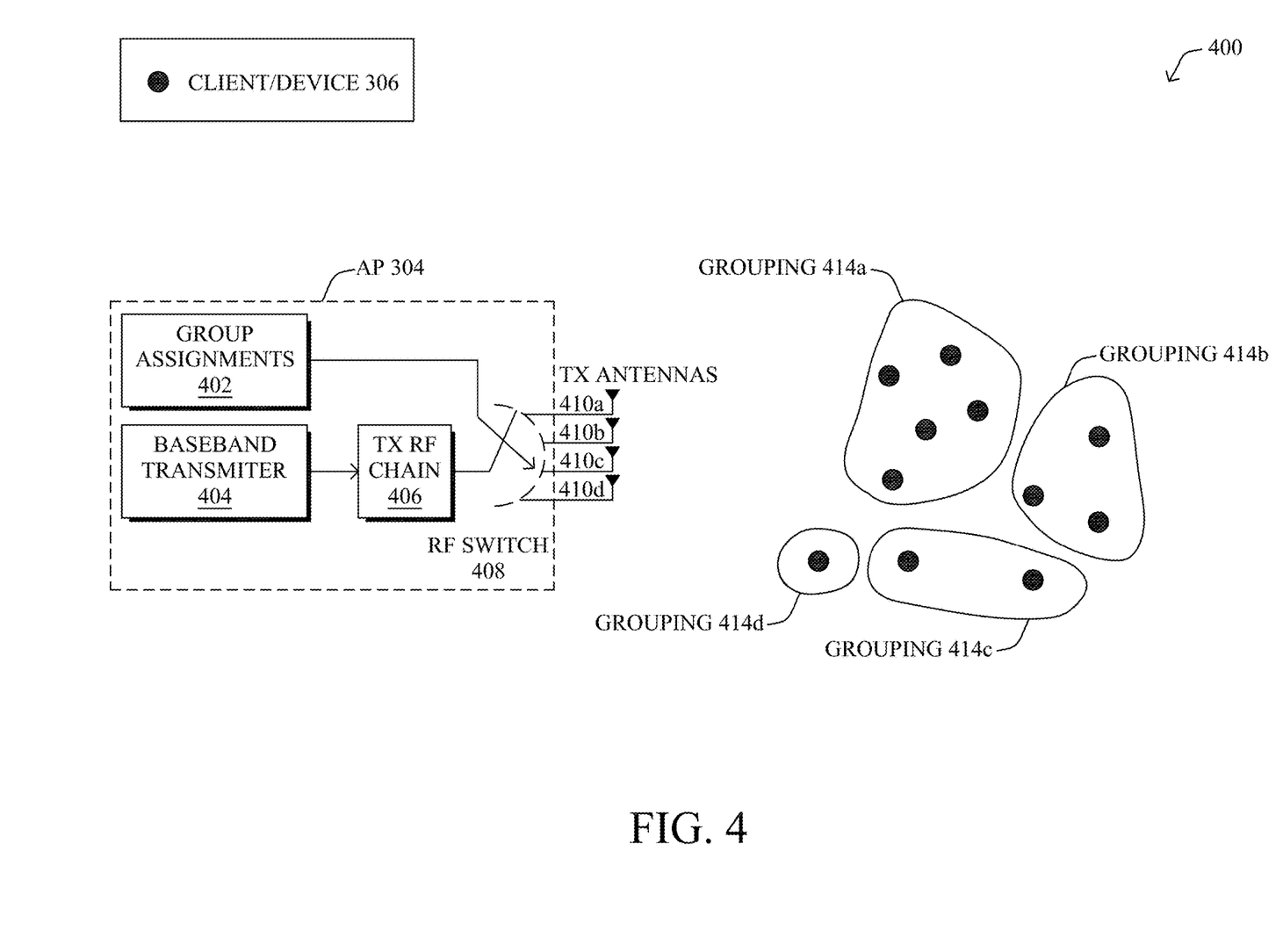
FIG. 4 illustrates an example of using spatial modulation for grouping wireless devices.

FIG. 4 illustrates an example 400 of using spatial modulation for grouping wireless devices, according to various embodiments. As shown, assume that an AP 304 includes a plurality of transmit (Tx) antennas 410a-410d to communicate with a plurality of clients 306 (e.g., IoT or other wireless devices).

In various embodiments, AP 304 may maintain a set of device group assignments 402 that group clients 306 into various groupings 414a-414d, which effectively serve as different multicast groups within the network. In turn, AP 304 may use spatial modulation to indicate which of groupings 414a-414d is the intended destination of the packet. As would be appreciated, the key idea behind spatial modulation is to use the index of the active antennas 410 at any time instant, to convey extra information with the packet.

To spatially modulate a packet, AP 304 may include a baseband transmitter 404 that always uses a single transmit RF chain 406 and controls an RF switch 408 to select which of transmit antennas 410a-410d is used to convey the packet. The index of the transmit antenna is unchanged during packet transmission and AP 304 may apply the selected group number assignment 402 on the packet after RF chain 406 and RF switch 408 select the antenna 410 corresponding to the group number. For example, the index of transmit antenna 410a may correspond to the group number of device grouping 414a in group assignments 402, the index of transmit antenna 410b may correspond to the group number of device grouping 414b in group assignments 402, the index of transmit antenna 410c may correspond to the group number of device grouping 414c in group assignments 402, and the index of transmit antenna 410d may correspond to the group number of device grouping 414d in group assignments 402. Thus, when a client device 306 receives the packet, it can quickly assess the group number/antenna index of the packet, to determine whether the packet was intended/destined for the client, without having to decode the entire packet.

Figure 5:
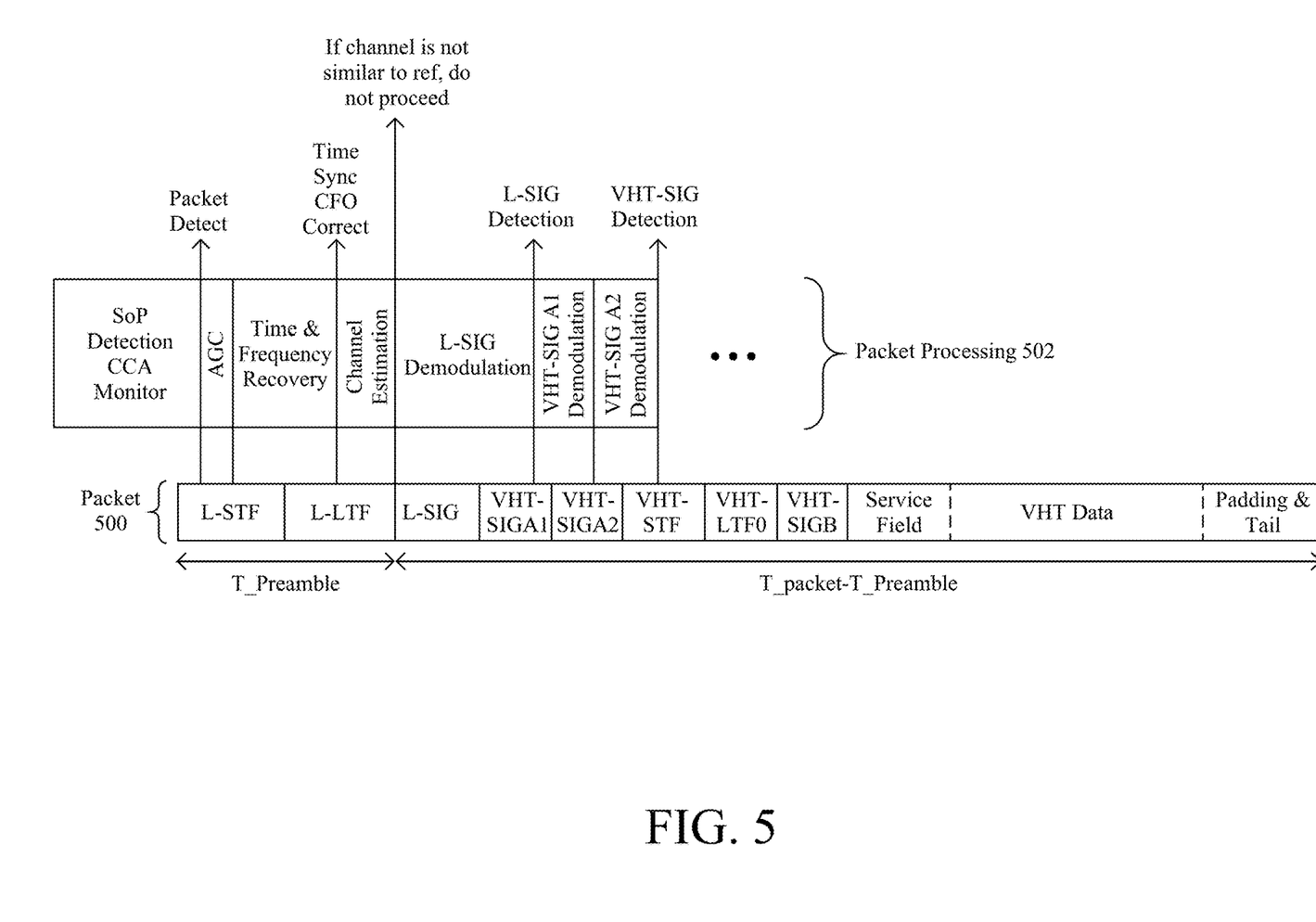
FIG. 5 illustrates an example of a wireless device processing a spatially modulated packet.

FIG. 5 illustrates an example of a wireless device processing a spatially modulated packet 500, according to various embodiments. As shown, packet 500 may comprises the following fields, as are typical of a very high throughput (VHT) wireless LAN (WLAN) packet:

Legacy short training field (L-STF)
Legacy long training field (L-LTF)
Legacy signal field (L-SIG)
VHT signal field A1 (VHT-SIGA1)
VHT-SIGA2
VHT short training field (VHT-STF)
VHT long training field (VHT-LTF)
VHT-SIGB
Data Service Field
VHT Data
Padding and Tail In general, the L-SFT, L-LFT, and L-SIG fields make up the legacy preamble of packet 500, the VHT-SIGA1, VHT-SIGA2, VHT-STF, VHT-LTF, and VHT-SIGB fields make up the VHT preamble of packet 500 and the remaining fields make up the data portion of packet 500.

When a device receives packet 500, it may perform the packet processing steps 502 shown. Namely, the device may begin by employing its start of packet (SoP) detection and clear channel assessment (CCA) mechanisms. When the device receives packet 500, its SoP detection mechanism detects packet 500. Next, the device may use its automatic gain control (AGC) and then apply its time and frequency recovery mechanism, to synchronize its time and perform carrier frequency offset (CFO) correction.

In one embodiment, as shown, channel estimation is required at the receiving device to be able to correctly decode the spatial domain. However, this information is always available in WLAN packets after processing the legacy preamble. Therefore, the receiving device can exploit the spatial index at the preamble and can decide to process the rest of the packet, if the packet is intended/destined for the device. For example, as shown, the device that received packet 500 may estimate the channel to equalize the rest of the OFDM symbols. As would be appreciated, this is a relatively fast process that only requires the receiving device to process the initial preamble fields of the packet. For example, preliminary testing has indicated that the channel estimation can be performed after only 16 μs.

To determine whether the device is the intended receiver of packet 500, it may compare the estimated channel to a locally-stored reference channel associated with the device. If the estimated channel matches that of the reference of the receiving device, it may continue to perform the packet processing steps 502, such as demodulating the L-SIG field of packet 500, demodulating the VHT-SIGA1 field of packet 500, demodulating the VHT-SIGA2 field of packet 500, etc. In other words, if the channel estimation indicates that packet 500 was intended for the receiving device, it may continue to process and decode the remainder of the packet.

Conversely, if the estimated channel is not similar to that of the reference, this means that packet 500 was not intended/destined for the receiving device. In various embodiments, when this happens, the receiving device may forego decoding the entirety of packet 500. From a resource consumption standpoint, assume that the receiving device is able to perform the channel estimation from analyzing the preamble information within the timespan T_Preamble. Further, assume that full processing of packet 500 will take T_packet amount of time to fully process. By stopping further processing of packet 500 after determining that it was not intended for the receiving device, this results in a processing savings of T_packet−T_Preamble amount of time, which can be quite significant.

According to various embodiments, there are two alternative ways to save power on the receiving device, when it determines that packet 500 was not intended/destined for it.

Under a first power saving mechanism, the receiving device may still decode the L-SIG symbol of packet 500. More specifically, once the receiving device determines that the received packet 500 is not intended for the device, based on the detected transmit antenna index/channel estimation, it may still proceed to decode the L-SIG symbol of packet 500. This provides the receiving device with the length of packet 500. In turn, in various embodiments, the device may turn off its radio receiver for an amount of time that corresponds to the remaining length of packet 500. Under this approach, the energy savings will be:

Saved Energy=Pavex($T$_VHTSIGA1/2+$T$_VHTSTF+
$n$_VHTLTF×$T$_VHTLTF+$T$_VHTSIGB+$T$_ServiceField+$T$_DATA+$T$_PaddingTail)+$P$_host×
($CRC$+$MAC$_process)

where Pave is the average power consumption of processing the packet and P_host is the power consumption in MAC layer.

By way of example, assume that an untended packet is a small packet with 128 bytes payload size and MCS 0. Then, number of OFDM symbols, nSym=(Octet*8+16+6)/N dps where Octet=128 and N dbps=24 for 20 MHz channel which results in nSym=44. This means that the radio of the receiving device can be turned off for the following:

4 μs×5+4 μs>44 (Data)=196 μs, plus skipping the
process in MAC layer.

From the above, this means that the radio of the receiving device is on for only 22 μs which results in a power savings of 89.9%.

In another embodiment, the receiving device may instead employ a power saving mechanism that does not require decoding the L-LTF symbol of packet 500. In this embodiment, rather than calculating the length of packet 500 from its L-SIG symbol, the receiving device can alternatively simply turn off its radio for a period of time based on the minimum size of packet 500. After this period of time elapses, the device may return to its SoP detection state. Thus, the amount of energy that can be saved from this approach is as follows:

Saved Energy=Pavex($T$_LSIG+$T$_VHTSIGA1/2+
$T$_VHTSTF+$n$_VHTLTF×$T$_VHTLTF+
$T$_VHTSIGB+$T$_ServiceField+$T$_PaddingTail)+
$P$_host×($CRC$+$MAC$_process)

Considering the same payload as in the previous example, the time that the radio of the device can be depowered is:

4 μs×1 (L-SIG)+4 μs×5+4 μs×1 (Data)=28 μs plus
skipping the process in MAC layer.

From the above, the radio of the device is on for 16 μs, which results in a power savings of 63.6%. Accordingly, the additional processing of the L-SIG symbol can actually reduce the amount of total power consumed by the device. However, either approach results in a fairly significant power savings at the device.

Note that the power off times calculated above are based on the process in PHY. The time gap between packets, i.e., the shortest interframe spaces (SIFSs) can be also considered which adds 16 μs to off time, in a further embodiment.

As explained above, the receiving device requires channel state information (CSI) to be able to correctly decode the spatial domain (e.g., the group address/antenna index). Notably, once the receiving device has performed its channel estimation from the preamble of a received packet, it may compare this to a reference channel stored locally that is associated with the device. This can be achieved in a number of ways, according to various embodiments.

Although the changing of channels may not be fast in IoT applications where the devices are not mobile, a mechanism is required for triggering the receiving device to update the reference channel. Typically, the device will have a channel update timeout based on the number of received packets during a certain time interval. When the device is in a power save mode based on this proposed scheme, it can go back to its normal mode of operation when the number of received packets that are intended for the device does not reach a certain predefined count in that time interface. This means that the reference channel of the device is outdated and needs to be updated.

Based on the detection methods detailed below, two types of reference channel updates are possible, according to various embodiments, either or both of which can be selected, depending on the accuracy requirements of the device.

In a first embodiment, each receiving device may be required to locally store only a single reference channel associated with its assigned group/antenna index. In this case, the receiving device only needs to have channel knowledge of its corresponding antenna and there is no need to estimate the entire channel matrix, making the computation fairly simple. Under this scheme, the sender (e.g., an AP) is not required to apply any specific action/sounding and can keep sending spatially modulated packets via its antenna associated with the intended device grouping. In turn, when the channel is outdated, a receiving device may listen to all packets transmitted by the sender and, once the device receives a packet intended for itself, it may save the channel state information from that packet as the reference channel.

In a further embodiment, the receiving device may alternatively store channel information for all channels used by the AP or other sender, which can provide for better accuracy. In this case, the AP or other sender sweeps its antennas when sending beacon packets to the various receiving devices. It will also add the index of the transmitted antenna inside the beacon payload. In turn, all receiving devices that are in an 'update reference channel mode' can determine the channels used by all transmit antennas of the sender and store them to detect the spatial domain (multicast address) of further packets.

Based on the two methods of channel updating described above, two detection methods are also possible, in various embodiments. These two detection approaches are illustrated in FIGS. 6A-6B, respectively.

Figure 6A:
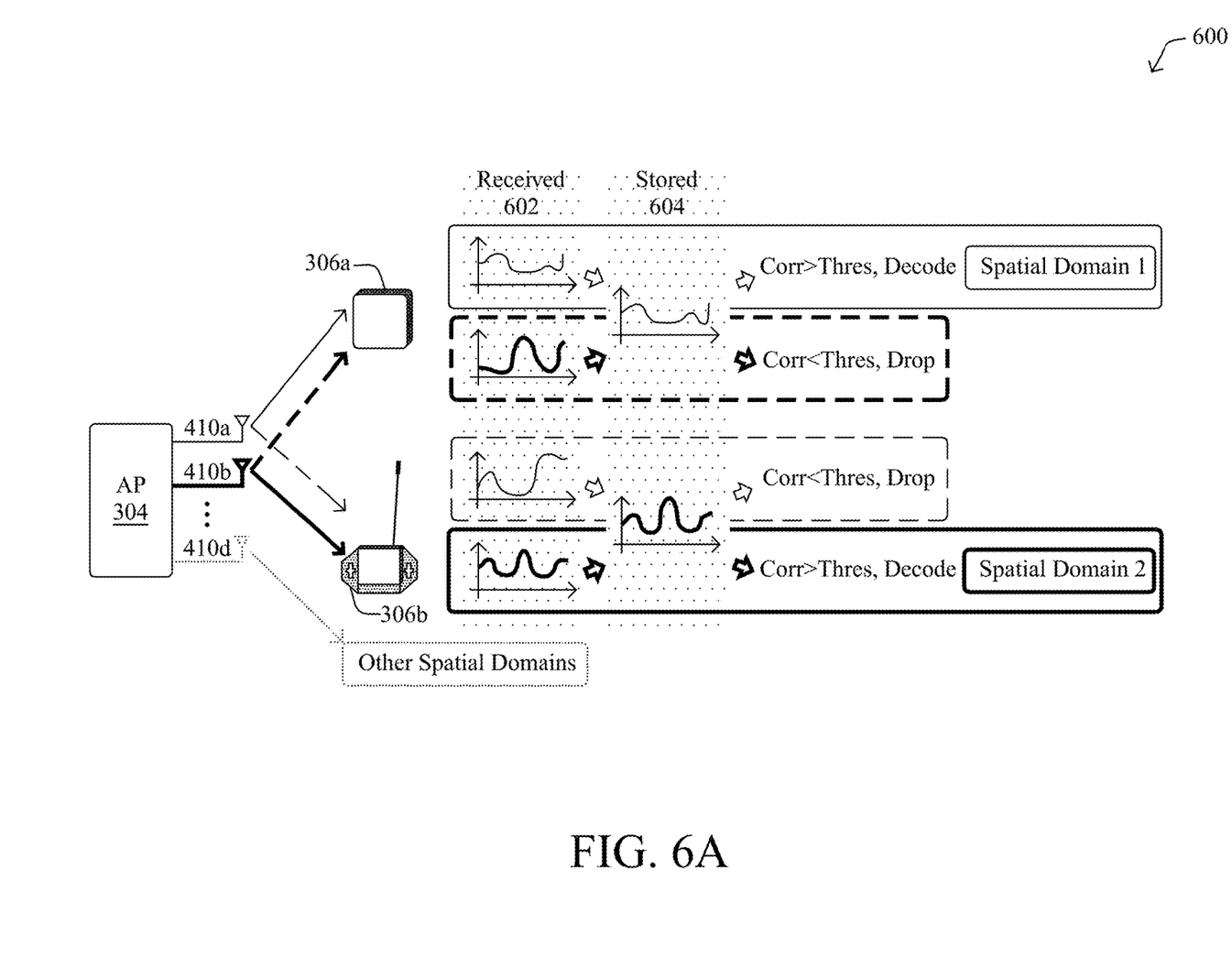
FIGS. 6A-6B illustrate examples of wireless devices estimating the channel of spatially modulated packets.
Figure 6B:
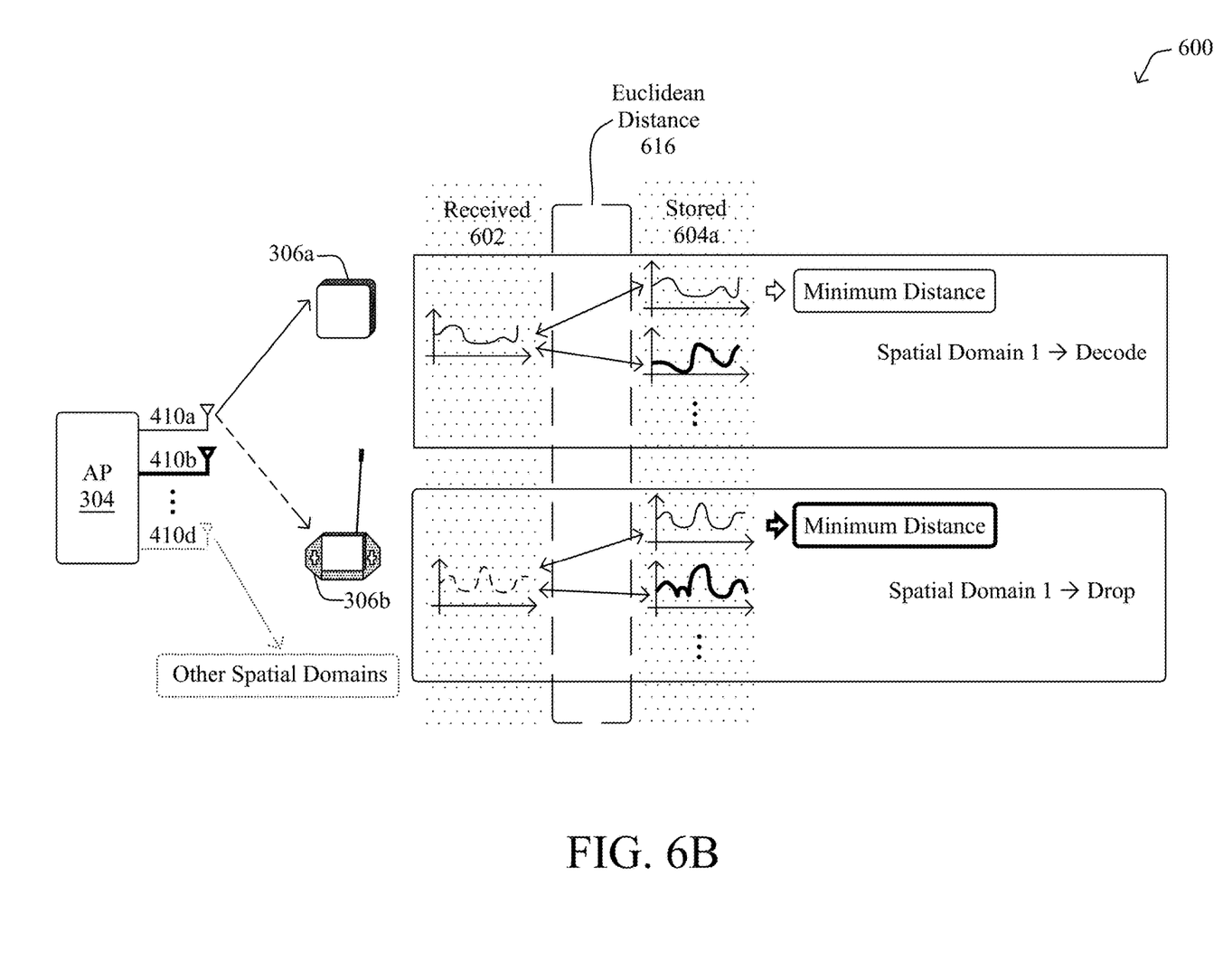

In a first embodiment, as shown in example 600 in FIG. 6A, assume that an AP 304 sends packets via its various antennas 410 to different devices 412 in the network, such as clients/devices 306a and 306b. Assume for purposes of illustration that antenna 410a is associated with the grouping to which device 306a belongs, that antenna 410b is associated with the grouping to which device 306b belongs, and that the other antennas of AP 304, such as antenna 410d shown, are associated with other spatial domains.

In the case shown, assume that each of devices 306a-306b store only the reference channels 604 associated with its respective device grouping. In such a case, the antenna index detection mechanism is relatively simple. This simplicity comes from the fact that the APM symbol (L-LTF) is known to the receiving device, meaning that the receiving device 306 only needs to make a binary hypothesis test to be able to detect its own channel among the other channels with the highest probability.

The OFDM based transmission of WLAN packets provides another dimension to the detection, to increase the probability of detection which is subcarriers (frequency domain). By comparing the whole channel estimation vector (all subcarriers) to the reference channel vector, the receiving device 306 can easily detect the spatial domain information of the received packet.

In some embodiments, the comparison between the received channel information 602 and the stored reference channel 604 on the receiving device 306 may entail evaluating the similarity of two complex vectors. For example, the receiving device 306 may compute the Pearson's Product-moment coefficient of the vectors, more commonly known as their correlation coefficient. This can be computed by dividing the covariance of the two variables by the product of their standard deviations.

As would be appreciated, the absolute value of a correlation coefficient varies between 0 and 1 and a larger value indicates greater similarity. In practice, a correlation coefficient of 0.9 or greater is large enough to show that the channels are similar. However, when there is significant correlation between transmit antennas and they are not spatially separated from each other, the correlation threshold should be adjusted very tight.

Using the above approach, each device 306 may compute the correlation coefficient (con) between its estimated channel information 602 for a received packet to its stored/reference channel information 604. In turn, if the correlation coefficient exceeds a predefined threshold, the device 306 may continue to decode the remainder of the packet. Conversely, if the correlation coefficient is below the threshold, the device 306 may drop further processing of the packet. Thus, when device 306a receives a packet from antenna 410a, it may determine that the packet was intended for the device(s) in the device grouping to which device 306a was assigned and continue to process the packet. Similarly, when device 306a receives a packet from antenna 410b of AP 304, it may determine that the channel information of the packet is not correlated to its stored reference channel information 604 and drop further processing of the packet. Device 306b may take a similar approach, but only process the full packets received from antenna 410b of AP 304.

Referring now to FIG. 6B, another possible implementation entails each of devices 306a-306b to store information 604a for all channels used by AP 304, not just its own reference. In this case, devices 306 may use a maximum likelihood detection approach and search over the different Euclidean distances 616 between the received channel information 602 and its stored channel information 604a, to determine whether the channel information 602 of the received packet matches that of its assigned channel. In other words, the index of the antenna used to transmit the packet, which is equivalently the destination grouping number/multicast address of the packet, is the reference channel 604a with the minimum Euclidean distance 616 to the estimated channel 602.

For example, as shown, assume that device 306a receives a packet from antenna 410a, which is associated with the device grouping to which device 306a belongs. If the reference channel 604a stored by device 306a with the minimum distance to that of the packet is assigned to device 306a, it may continue to decode and process the remainder of the packet. Conversely, assume that device 306b also receives the same packet. In this case, device 306b may determine that the stored channel 604a with the shortest Euclidean distance 616 to that of the received packet is associated with a spatial domain not assigned to the device grouping of device 306b and, in turn, drop processing of the packet.

As would be appreciated, in addition to ceasing further decoding and processing of a packet not intended for the receiving device 306, the device may also depower (e.g., turn off) its radio receiver for an amount of time associated with either the remainder of the packet or for a time associated with the remainder of the packet up to a minimum size of the packet.

Various modifications are possible to the above approaches, in further embodiments. In another embodiment, generalized spatial modulation can be used whereby a subset of the antennas of a sender are assigned to a particular device grouping, as opposed to a single antenna. Although this generalized approach requires more RF chains, with a maximum size of the antenna subsets, this also enables the sender to serve more than Nt groups of devices. Considering R-number of RF chains available at transmitter, the total number of groups that can be supported is:

Total Number of Groups=$C(Nt,R)+C(Nt,R-1)+ \ldots + C(Nt,1)$ where $C(k,n)$ is a k-combination of set size n.

In a further embodiment, the spatial modulation-based device groupings introduced herein can be used in conjunction with target wait time (TWT) feature of 802.11ax, where a group of stations are scheduled to listen/transmit to reduce the power consumption. With the spatial modulation antenna groupings, another level of grouping can be applied on TWT to further reduce the power consumption of receiving devices, if the listen time intervals of TWT clients in a certain group are overlapped. Then, the wait time of the network can be reduced to be able to send immediate commands to devices and the increased power consumption from this change can be compensated by the antenna-aided grouping method.

In yet another embodiment, the above power saving approaches can also be used in combination with the upcoming 802.11ba standard for Low-Power Wake Up Radios (LP_WURs). In this case, all other unintended packets during the wake up interval of receiver are skipped, providing another level of power saving over the standard.

In another embodiment, while the spatial domain is used herein to transmit the multicast address/device grouping index to receiving devices, the low complexity detection method detailed above can even be used when the sender only has a single antenna. In this case, the benefit of using the proposed method is saving power by skipping further processing of unintended packets from other APs or clients.

In yet further embodiments, in addition to communicating the device grouping with spatial modulation, the grouping can also be combined with encoding the group number into the L-LTF by either 1.) making the detection of the group ID more robust or 2.) expanding the number of groups by adding the LTF coding dimension with the spatial modulation dimension.

Figure 7:
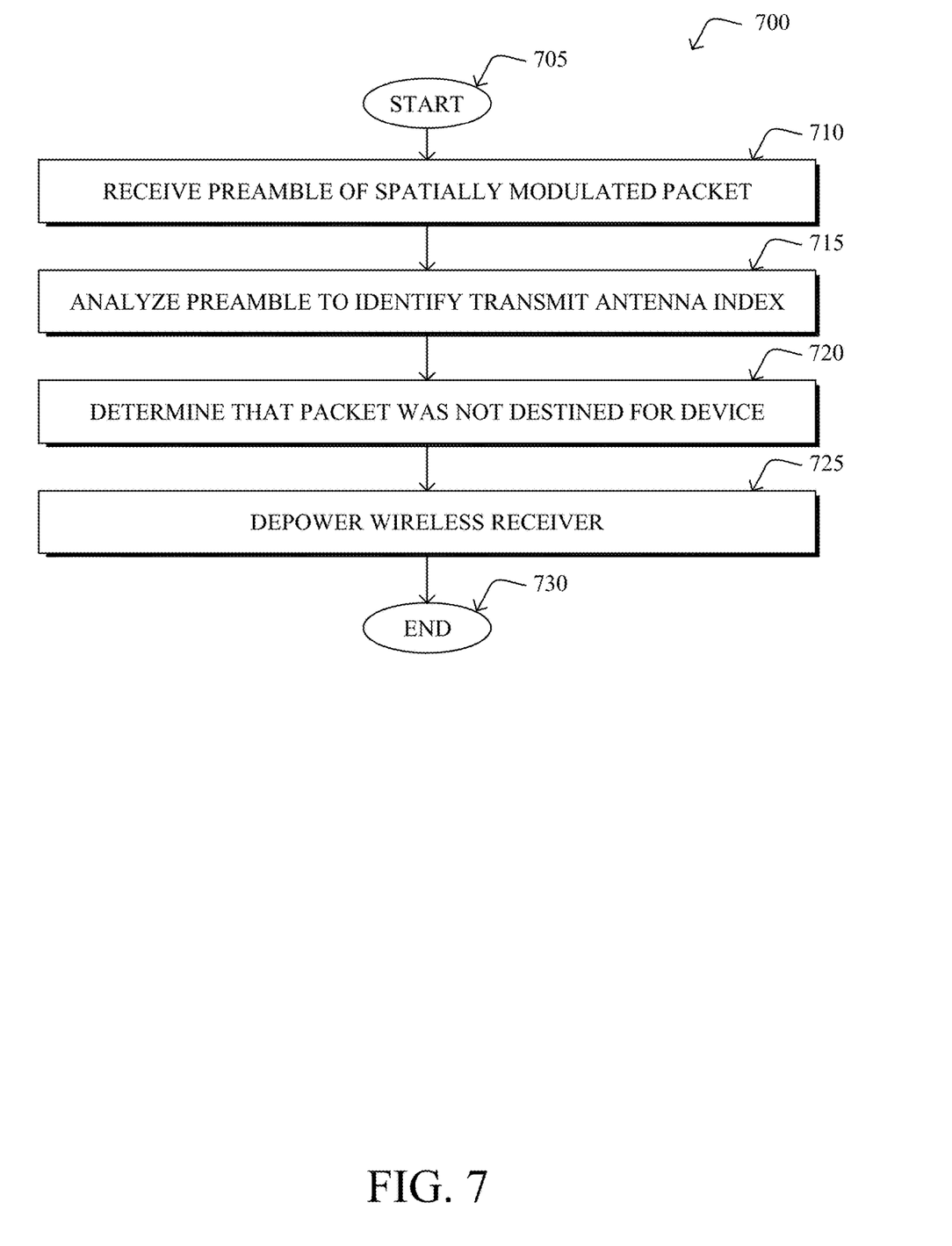
FIG. 7 illustrates an example simplified procedure for using spatial modulation for power savings.

FIG. 7 illustrates an example simplified procedure for using spatial modulation for power savings, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may receive, at a wireless receiver of the device, a preamble of a spatially modulated packet. For example, the packet may be a WLAN packet and the preamble may include L-STF, L-LTF, and L-SIG symbols/fields.

At step 715, as detailed above, the device may analyze the preamble of the packet to identify a transmit antenna index of the packet. To do so, in some embodiments, the device may estimate a channel from the preamble of the packet associated with the transmit antenna index. For example, the device may assess the L-LTF information from the preamble of the packet, to estimate the channel of the packet.

At step 720, the device may determine that the packet was not destined for the device, based on the transmit antenna index of the packet, as described in greater detail above. In some embodiments, the device may do so by comparing an estimated channel of the packet to a reference channel associated with the device. The device may store only the reference channel associated with its device grouping or, alternatively, all channels used by the sender of the packet. In the single reference channel case, the device may store the reference channel based on the channel used by a packet destined for the device. In the multiple reference channel case, the device may store channel information obtained from beacons sent by the sender that indicate the channel information.

At step 725, as detailed above, the device may depowering, by the device and prior to decoding the complete packet, the wireless receiver of the device, based on the determination that the packet was not destined for the device. In one embodiment, the device may do so by decoding a legacy signal (L-SIG) symbol of the packet to determine a length of the packet and computing an amount of time to depower the receiver based on the determined length of the packet (e.g., the remainder of the packet). Alternatively, the device may compute an amount of time to depower the receiver based on a minimum size of the packet, without decoding the L-SIG of the packet. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help to reduce the resource and power consumption of a device by using spatial modulation to denote the intended receiver(s) of a packet. In doing so, the device can quickly assess the preamble of the packet and determine whether the packet was intended for the device. If it is not, the device can skip further decoding and processing of the packet and depower its radio receiver for a corresponding amount of time. For IoT device and other receiving devices with constrained resources, this approach can have a considerable effect on the battery lifespan of the device.

While there have been shown and described illustrative embodiments that provide for using spatial modulation to group devices, it is to be understood that various other adaptations and modifications may be made within the spirit and scope of the embodiments herein. For example, while certain protocols are shown, such as 802.11, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a wireless receiver of a device in a network, a preamble of a spatially modulated packet;
   analyzing, by the device, the preamble of the packet to identify a transmit antenna index of the packet;
   determining, by the device, that the packet was not destined for the device, based on the transmit antenna index of the packet; and
   depowering, by the device and prior to decoding the complete packet, the wireless receiver of the device, based on the determination that the packet was not destined for the device.

2. The method as in claim 1, wherein the transmit antenna index of the packet is associated with one or more other devices in the network.

3. The method as in claim 1, wherein depowering, prior to decoding the complete packet, the wireless receiver of the device, based on the determination that the packet was not destined for the device, comprises:
   computing an amount of time to depower the receiver based on a minimum size of the packet.

4. The method as in claim 1, wherein depowering, prior to decoding the complete packet, the wireless receiver of the device, based on the determination that the packet was not destined for the device, comprises:
   decoding a legacy signal (L-SIG) symbol of the packet to determine a length of the packet; and
   computing an amount of time to depower the receiver based on the determined length of the packet.

5. The method as in claim 1, wherein analyzing the preamble of the packet to identify a transmit antenna index of the packet comprises:

estimating a channel from the preamble of the packet associated with the transmit antenna index, and wherein determining that the packet was not destined for the device, based on the transmit antenna index of the packet, comprises:
comparing the estimated channel to a reference channel associated with the device.

6. The method as in claim 5, further comprising:
receiving, at the device, a beacon that includes channel information for the reference channel; and
storing, by the device, the reference channel based on channel information from the beacon.

7. The method as in claim 5, further comprising:
receiving, at the device, a packet destined for the device; and
storing, by the device, the reference channel based on channel information from the packet destined for the device.

8. The method as in claim 1, wherein the wireless receiver of the device receives the packet during a target wait time (TWT) listen time interval.

9. The method as in claim 1, wherein the device receives the packet during an 802.11ba wake up interval of the device, and wherein the method further comprises:
skipping, based on the determination that the packet was not destined for the device, processing of further packets received by the device during the wakeup interval of the device.

10. The method as in claim 1, wherein the device receives the packet from a wireless access point with a single antenna.

11. The method as in claim 1, wherein the device determines that the packet was not destined for the device, based further in part on a group identifier encoded in a legacy long training field (L-LTF) of the packet.

12. An apparatus, comprising:
one or more network interfaces to communicate with a network, wherein the one or more network interfaces comprise a wireless receiver;
a processor coupled to the network interfaces and adapted to execute one or more processes; and
a memory configured to store a process executable by the processor, the process when executed configured to:
receive, at the wireless receiver of the apparatus, a preamble of a spatially modulated packet;
analyze the preamble of the packet to identify a transmit antenna index of the packet;
determine that the packet was not destined for the apparatus, based on the transmit antenna index of the packet; and
depower, prior to decoding the complete packet, the wireless receiver of the apparatus, based on the determination that the packet was not destined for the apparatus.

13. The apparatus as in claim 12, wherein the transmit antenna index of the packet is associated with one or more other devices in the network.

14. The apparatus as in claim 12, wherein the apparatus depowers, prior to decoding the complete packet, the wireless receiver of the apparatus, based on the determination that the packet was not destined for the apparatus, by:
computing an amount of time to depower the receiver based on a minimum size of the packet.

15. The apparatus as in claim 12, wherein the apparatus depowers, prior to decoding the complete packet, the wireless receiver of the apparatus, based on the determination that the packet was not destined for the apparatus, by:
decoding a legacy signal (L-SIG) symbol of the packet to determine a length of the packet; and
computing an amount of time to depower the receiver based on the determined length of the packet.

16. The apparatus as in claim 12, wherein the apparatus analyzes the preamble of the packet to identify a transmit antenna index of the packet by:
estimating a channel from the preamble of the packet associated with the transmit antenna index, and wherein the apparatus determines that the packet was not destined for the apparatus, based on the transmit antenna index of the packet, by:
comparing the estimated channel to a reference channel associated with the apparatus.

17. The apparatus as in claim 16, wherein the process when executed is further configured to:
receive a beacon that includes channel information for the reference channel; and
store the reference channel based on channel information from the beacon.

18. The apparatus as in claim 16, wherein the process when executed is further configured to:
receive a packet destined for the device; and
store the reference channel based on channel information from the packet destined for the apparatus.

19. A tangible, non-transitory, computer-readable medium storing program instructions that cause a device in a network to execute a process comprising:
receiving, at a wireless receiver of the device, a preamble of a spatially modulated packet;
analyzing, by the device, the preamble of the packet to identify a transmit antenna index of the packet;
determining, by the device, that the packet was not destined for the device, based on the transmit antenna index of the packet; and
depowering, by the device and prior to decoding the complete packet, the wireless receiver of the device, based on the determination that the packet was not destined for the device.

20. The computer-readable medium as in claim 19, wherein the transmit antenna index of the packet is associated with one or more other devices in the network.

* * * * *

UNITED STATES PATENT AND TRADEMARK OFFICE
CERTIFICATE OF CORRECTION

PATENT NO. : 10,904,831 B2
APPLICATION NO. : 16/406184
DATED : January 26, 2021
INVENTOR(S) : Ardalan Alizadeh et al.

It is certified that error appears in the above-identified patent and that said Letters Patent is hereby corrected as shown below:

In the Specification

Column 11, Line 51, should read:
the correlation coefficient (corr) between its estimated chan- Signed and Sealed this
First Day of June, 2021

Drew Hirshfeld
*Performing the Functions and Duties of the*
*Under Secretary of Commerce for Intellectual Property and*
*Director of the United States Patent and Trademark Office*